United States Patent

Tanaka et al.

[11] Patent Number: 6,008,297
[45] Date of Patent: Dec. 28, 1999

[54] POLYAMIDE RESIN COMPOSITION AND PROCESS FOR PRODUCING THE SAME

[75] Inventors: Yasuo Tanaka; Youji Hayakawa, both of Ichihara, Japan

[73] Assignee: Mitsui Chemicals, Inc., Tokyo, Japan

[21] Appl. No.: 09/079,159

[22] Filed: May 15, 1998

[30] Foreign Application Priority Data

May 16, 1997 [JP] Japan .................................. 9-127503

[51] Int. Cl.$^6$ ...................................... C08F 08/30
[52] U.S. Cl. ........................... 525/178; 524/81; 524/401; 525/64; 525/66; 525/70; 525/71; 525/72; 525/88; 525/89; 525/95; 525/96; 525/185
[58] Field of Search ....................... 524/81, 401; 525/64, 525/66, 70, 71, 72, 88, 89, 95, 96, 178, 185

[56] References Cited

U.S. PATENT DOCUMENTS

| | | | |
|---|---|---|---|
| 5,482,770 | 1/1996 | Rekele | 428/339 |
| 5,482,771 | 1/1996 | Shah | 428/349 |
| 5,591,792 | 1/1997 | Hattori et al. | 524/271 |
| 5,658,625 | 8/1997 | Bradfute et al. | 428/34.9 |
| 5,679,422 | 10/1997 | Lind et al. | 428/34.8 |
| 5,744,250 | 4/1998 | Lee et al. | 428/516 |
| 5,759,648 | 6/1998 | Idlas | 428/34.9 |
| 5,792,549 | 8/1998 | Wilkie | 428/215 |

FOREIGN PATENT DOCUMENTS

| | | |
|---|---|---|
| 754731 | 1/1997 | European Pat. Off. . |
| 59-78256A | 5/1984 | Japan . |
| 62-79260A | 4/1987 | Japan . |

*Primary Examiner*—Samuel A. Acquah
*Attorney, Agent, or Firm*—Birch, Stewart, Kolasch & Birch, LLP

[57] ABSTRACT

A polyamide resin composition superior in the shock resitance, especially low temperature shock resistence, in the rigidity and in the water absorption resistance, which comprises (A) 98–50 % by weight of a polyamide, (B) 1–40 % by weight of a modified ethylene/α-olefin copolymer having an MFR (190° C.) of 0.05–50 g/10 min., obtained by a graft-copolymerization of 100 parts by weight of an ethylene/α-olefin copolymer (B-1) having an ethylene content of 40–93 mole % and a density of lower than 0.900 g/cm$^3$, with, grafted thereon, 0.01–5 parts by weight of an unsaturated dicarboxylic acid or its derivative (B-2), and (C) 1–40 % by weight of at least one ethylenic copolymer selected from the group consisting of an ethylene/α-olefin copolymer (C-1) having an α-olefin content of 10 mole % or less, an Mw/Mn of 2.5 or lower and an MFR (190° C.) of 0.05–50 g/10 min. and a modified ethylen/α-olefin copolymer (C-2) obtained by a graft-copolymerization of 100 parts by weight of the ethylene/α-olefin copolymer (C-1) with, grafted thereon, 0.01–5 parts by weight of the unsaturated dicarboxylic acid or its derivative (B-2), wherein the weight ratio of (B)/(C) is in the range of 20–0.05.

8 Claims, No Drawings

POLYAMIDE RESIN COMPOSITION AND PROCESS FOR PRODUCING THE SAME

FIELD OF THE INVENTION

The present invention relates to a polyamide resin composition which is superior in the shock resistance, rigidity and water absorption resistance as well as to a process for producing such a polyamide resin composition.

BACKGROUND OF THE INVENTION

A large demand is expected for polyamide resins as engineering plastics due to their superior material properties. However, their impact strength, especially low temperature shock resistance is not quite satisfactory and improvement thereof has long been expected. As a measure for improving the shock resistance, it is described, for example, in Japanese Patent Kokais Sho 55-9661 A and Sho 55-9662 A, that the Izod impact strength of polyamide resin is improved by blending an ethylene/α-olefin copolymer obtained by grafting an α, β-unsaturated carboxylic acid onto a polyamide resin. However, such a technical measure of improving the Izod impact strength by mixing with an ethylene/α-olefin copolymer brings about a new problem that the rigidity of the resulting polyamide resin is thereby decreased considerably. In addition, the resulting resin will exhibit insufficient falling-weight impact strength at low temperatures, so that the low temperature impact strength of practical molded articles is not satisfactory.

In Japanese Patent Kokai Sho 59-78256 A, a polyamide resin composition is disclosed, which contains a polyamide, a modified ethylene/α-olefin copolymer and an ethylene homopolymer and exhibits an improved shock resistance. This polyamide resin composition brings about, however, only an insufficient improvement in the low temperature shock resistance, since the ethylene homopolymer incorporated here has a large molecular weight distribution value (Mw/Mn).

SUMMARY OF THE INVENTION

An object of the present invention is to provide a polyamide resin composition which is superior not only in the shock resistance, in particular, low temperature shock resistance, but also in the rigidity and water absorption resistance.

Another object of the present invention is to provide a process for producing such a polyamide resin composition in an easy and efficient manner.

The inventors had been in research works for improving the falling-weight impact strength and Izod impact strength at low temperatures in order to solve the above problem of insufficient low temperature impact strength of practical molded articles and discovered that a polyamide resin composition which is superior in the low temperature shock resistance (i.e., falling-weight impact strength and Izod impact strength) and in the rigidity and which shows scarce decrease in the rigidity and insignificant change in dimension can be obtained by blending specific polymer components defined according to the present invention in combination, whereby the inventors have reached the present invention.

Thus, the present invention consists in the following polyamide resin composition and process for producing it:

(1) A polyamide resin composition comprising
(A) 98–50% of a polyamide,
(B) 1–40% of a modified ethylene/α-olefin copolymer having a melt flow rate (MFR), determined at 190° C., of 0.05–50 g/10 min., obtained by a graft-copolymerization of
(B-1) 100 parts by weight of an ethylene/α-olefin copolymer having an ethylene content of 40–93 mole %, a content of $C_3$ or higher α-olefin of 60–7 mole % and a density of lower than 0.900 g/cm$^3$ with, grafted thereon,
(B-2) 0.01–5 parts by weight of an unsaturated dicarboxylic acid or its derivative, and
(C) 1–40% of at least one ethylenic copolymer selected from the group consisting of
(C-1) an ethylene/α-olefin copolymer having a ratio of weight-average molecular weight to number-average molecular weight (Mw/Mn) of 2.5 or lower, a melt flow rate (MFR), determined at 190° C., of 0.05–50 g/10 min., a content of $C_3$ or higher α-olefin of 10 mole % or less and a density in the range of 0.970–0.900 g/cm$^3$ and
(C-2) a modified ethylene/α-olefin copolymer obtained by a graft-copolymerization of 100 parts by weight of the ethylene/α-olefin copolymer (C-1) with, grafted thereon, 0.01–5 parts by weight of the unsaturated dicarboxylic acid or its derivative (B-2), based on the total weight of the constituent polymers (A), (B) and (C), wherein the weight ratio of (B)/(C) is in the range of 20–0.05.

(2) A polyamide resin composition as defined in above (1), wherein the ethylene/α-olefin copolymer (B-1) has a density in the range of 0.850–0.890 g/cm$^3$.

(3) A polyamide resin composition as defined in above (1) or (2), wherein the ethylene/α-olefin copolymer (C-1) is produced by polymerization in the presence of a metallocene catalyst.

(4) A polyamide resin composition as defined in above (1) or (2), wherein the ethylene/α-olefin copolymer (C-1) is a linear low density polyethylene (LLDPE) produced by polymerization in the presence of a metallocene catalyst.

(5) A polyamide resin composition as defined in either one of above (1) to (4), wherein the ethylene/α-olefin copolymer (C-1) has a density in the range of 0.940–0.900 g/cm$^3$.

(6) A process for producing a polyamide resin composition, comprising melt mixing preliminarily
(B) 1–40 parts by weight of a modified ethylene/α-olefin copolymer having a melt flow rate (MFR), determined at 190° C., of 0.05–50 g/10 min., obtained by a graft-copolymerization of
(B-1) 100 parts by weight of an ethylene/α-olefin copolymer having an ethylene content of 40–93 mole %, a content of $C_3$ or higher α-olefin of 60–7 mole % and a density of lower than 0.900 g/cm$^3$ with, grafted thereon,
(B-2) 0.01–5 parts by weight of an unsaturated dicarboxylic acid or its derivative with
(C) 1–40 parts by weight of at least one ethylenic copolymer selected from the group consisting of
(C-1) an ethylene/α-olefin copolymer having a ratio of weight-average molecular weight to number-average molecular weight (Mw/Mn) of 2.5 or lower, a melt flow rate (MFR), determined at 190° C., of 0.05–50 g/10 min., a content of $C_3$ or higher α-olefin of 10 mole % or less and a density in the range of 0.970–0.900 g/cm$^3$ and
(C-2) a modified ethylene/α-olefin co-polymer obtained by a graft-copoly-merization of 100 parts by weight of the ethylene/α-olefin copolymer (C-1) with, grafted thereon, 0.01–5 parts by weight of the unsaturated dicarboxylic acid or its derivative (B-2), in a weight ratio of (B)/(C) within a range of 20–0.05 and melt mixing this premix with 98–50 parts by weight of a polyamide (A), wherein the total sum of the constituent polymers (A), (B) and (C) amounts to 100 parts by weight.

(7) A process as defined in above (6), wherein the ethylene/α-olefin copolymer (C-1) is produced by polymerization in the presence of a metallocene catalyst.

(8) A process as defined in above (6), wherein the ethylene/α-olefin copolymer (C-1) is a linear low density polyethylene (LLDPE) produced by polymerization in the presence of a metallocene catalyst.

DETAILED DESCRIPTION OF THE INVENTION

The polyamide (A) to be incorporated according to the present invention is a polymer having in its main chain a plurality of amido linkages (—NHCO—) and known ones can be used therefor without any limitation. They have molecular weights which are enough for forming molded articles.

The polyamide (A) can be produced by, for example, equimolar polycondensation of a saturated organic dicarboxylic acid having 4–12 carbon atoms and an organic diamine having 2–13 carbon atoms. Here, the organic diamine is used preferably in a little excess over the dicarboxylic acid so that the polyamide molecules (A) have predominantly terminal amino groups. It is permissible, in reverse, that they have predominantly terminal carboxyl groups.

Representative dicarboxylic acids for producing the polyamide (A) are adipic acid, pimelic acid, suberic acid, azelaic acid, sebacic acid and dodecanedicarboxylic acid. The polyamide (A) can also be produced using a derivative of dicarboxylic acid, for example, an ester, acid cloride or amine salt. They may be used alone or in a combination of two or more of them.

Representative diamine are hexamethylenediamine, octamethylenediamine and derivatives of them. They may be used alone or in a combination of two or more of them.

The polyamide (A) can also be produced by a ring-opening polymerization of lactams.

For the polyamide (A) produced by poly-condensation of a dicarboxylic acid with a diamine, there may be enumerated, for example, polyhexamethyleneadipamide (nylon 66), polyhexamethyleneazelamide (nylon 69), polyhexamethylenesebacamide (nylon 610), polyhexamethylenedodecamide (nylon 612) and polybis(4-aminocyclohexyl)methanedodecamide. For the polyamide (A) produced by the ring-opening polymerization, there may be enumerated, for example, polycaprolactam (nylon 6) and polylauric lactam.

The polyamide (A) may be incorporated either alone or in a combination of two or more of such polyamides.

Examples of the polyamide (A) used preferably according to the present invention include polyhexamethyleneadipamide (nylon 66) and a mixture of polyhexamethyleneadipamide (nylon 66) with polycaprolactam (nylon 6).

The modified ethylene/α-olefin copolymer (B) used according to the present invention is a graft-copolymerization product of an ethylene/α-olefin copolymer (B-1) with, grafted thereon in a certain proportion, a grafting monomer selected from the group consisting of unsaturated dicarboxylic acids and their derivatives (B-2). The starting ethylene/α-olefin copolymer (B-1) has an ethylene content of 40–93 mole %, preferably 60–85 mole %, more preferably 75–85 mole %, and a content of C, or higher α-olefin of 60–7 mole %, preferably 40–15 mole %, more preferably 25–15 mole %. When the ethylene content in the starting unmodified ethylene/α-olefin copolymer (B-1) exceeds over the value of 93 mole % or exceeds down the value of 40 mole %, it comes to reveal an excessively high crystalline nature, so that the effect of improvement in the shock resistance of the polyamide resin composition obtained by admixing the graft-modified product of the copolymer (B-1) togeter with the ethylenic copolymer (C), described afterwards, to the polyamide (A) will not be sufficient.

The ethylene/e -olefin copolymer (B-1) should have a density lower than 0.900 g/cm$^3$, preferably in the range of 0.850–0.890 g/cm$^3$. In the case where the α-olefin is propylene, the density may preferably be, in particular, in the range of 0.850–0.870 g/cm$^3$. In the case where the α-olefin is one having 4–18 carbon atoms, the density may particularly preferably be in the range of 0.850–0.875 g/cm$^3$.

The ethylene/α-olefin copolymer (B-1) should have a melt flow rate (MFR, determined at 190° C. in accordance with ASTM D-1238 E under a load of 2160 g) in the range of 0.05–50 g/10 min., preferably 0.1–20 g/10 min. When the MFR value is either lower than 0.05 g/10 min. or higher than 50 g/10 min., the difference in the melt viscosity between the graft-modified ethylene/α-olefin copolymer (B) obtained from the starting copolymer (B-1) and the polyamide (A) tends to increase, so that the effect of improvement in the dispersion of the graft-modified copolymer (B) in the polyamide (A) will not be sufficient, whereby the effect of improvement in the shock resistance on combining with the ethylenic copolymer (C), described afterwards, will tend to decrease.

It is favorable that the ethylene/α-olefin copolymer (B-1) is of low-crystalline or non-crystalline nature having a degree of crystallinity usually of 0–50%, preferably 0–20%.

The α-olefin component for the ethylene/α-olefin copolymer (B-1) may be, for example, those having 3 or more carbon atoms, preferably 3–18 carbon atoms, such as propylene, 1-butene, 1-hexene, 4-methyl-1-pentene, 1-octene and 1-decene. They are used either solely or in combination of two or more of them.

While the ethylene/α-olefin copolymer (B-1) may usually be a copolymer of ethylene and an α-olefin component mentioned above, it is permissible in some instances that other component(s), such as diene and the like, may also be contained in an insignificant proportion, for example, 0.5 mole % or less. If the content of such a diene component is greater than 0.5 mole %, occurrence of cross linking may interfere the uniform mixing of the modified copolymer (B) with the ethylenic copolymer (C) and may deteriorate homogeneous dispersion of these constituent polymers in the polyamide (A).

The ethylene/α-olefin copolymer (B-1) can be produced by known techniques, such as polymerization using a Zieglar-Natta catalyst or a metallocene catalyst, ICI process, BASF process, Phillips process and Standard process.

For the unsaturated dicarboxylic acid (B-2) to be used as the grafting monomer, there may be enumerated, for example, maleic acid, tetrahydrophthalic acid, itaconic acid, citraconic acid, crotonic acid, isocrotonic acid and Nadic acid (endocis-bicyclo[2.2.1] hept-5-en-2,3-dicarboxylic acid). For the derivatives of these unsaturated dicarboxylic acids (B-2), there may be exemplified acid halides, amides, imides, acid anhydrides and esters. Concrete examples of such derivatives include malenyl chloride, maleimide, maleic anhydride, citraconic anhydride, monomethyl maleate, dimethyl maleate and glycidyl maleate. Among them, acid anhydrides, in particular, maleic anhydride and Nadic acid anhydride are preferable. They may be used either alone or in a combination of two or more of them.

The weight proportion of the grafting monomer, i.e. unsaturated dicarboxylic acid or its derivative (B-2), relative to the ethylene/α-olefin copolymer (B-1) to be used upon the graft-copolymerization into the graft-modified ethylene/α-olefin copolymer (B) according to the present invention may favorably be in the range of 0.01–5 parts by weight, preferably 0.1–4 parts by weight, of the former (B-2) per 100 parts by weight of the latter (B-1). If this weight proportion is short of 0.01 part per 100 parts of the copolymer (B-1), the compatibility of the graft-modified copolymer (B) with the polyamide (A) becomes inferior, resulting in occurrence of laminar exfoliation with decrease in the effect of improvement of the shock resistance. If the said weight proportion is higher than 5 parts per 100 parts of the copolymer (B-1), the thereby increased degree of cross linking in the graft-modified copolymer (B) will bring about deterioration of the improvement in the shock resistance.

The graft-modified ethylene/α-olefin copolymer (B) should have a melt flow rate (MFR, determined at 190° C. under a load of 2160 g) in the range of 0.05–50 g/10 min., preferably 0.1–20 g/10 min.

The graft-modified ethylene/α-olefin copolymer (B) may usually have a density favorably lower than 0.902 g/cm3, preferably in the range of 0.852–0.892 g/cm$^3$. In the case where the α-olefin is propylene, the graft-modified copolymer may particularly preferably have a density in the range of 0.852–0.872 g/cm$^3$. In the case where the α-olefin is one having 4–18 carbon atoms, the graft-modified copolymer may particularly preferably have a density in the range of 0.852–0.877 g/cm$^3$.

For grafting the grafting monomer selected from the group consisting of the unsaturated dicarboxylic acids and derivatives thereof (B-2) onto the ethylene/α-olefin copolymer (B-1), known techniques can be applied. For example, a method may be employed, in which the ethylene/α-olefin copolymer (B-1) is melted or dissolved in a solvent and the grafting monomer (B-2) is added therto to cause the graft-copolymerization. The graft-copolymerization may be effected in the co-existence of other vinyl monomer(s), such as styrene and the like. Especially, a modified ethylene/α-olefin copolymer (B), obtained by performing the graft-copolymerization efficiently under the use of a free radical generating agent, can favorably be used according to the present invention, since occurrence of oxidative degradation of the starting ethylene/α-olefin copolymer (B-1) becomes scarce.

As the free radical generating agent, there may be used an organic peroxide, organic perester or azo compound. Concrete examples therefor include benzoyl peroxide, dichlorobenzoyl peroxide, dicumyl peroxide, di-tert-butyl peroxide, 2,5-dimethyl-2,5-di(peroxybenzoate)hexine-3, 1,4-bis(tert-butylperoxyisopropyl)benzene, lauroylperoxide, tert-butylperacetate, 2,5-dimethyl-2,5-di(tert-butylperoxy) hexine-3, 2,5-dimethyl-2,5-di(tertbutylperoxy)hexane, tert-butyl perbenzoate, tert-butyl perphenylacetate, tert-butyl perisobutyrate, tert-butyl per-sec-octoate, tert-butyl perpivalate, cumyl perpivalate, tert-butyl perdiethylacetate, azobisisobutyronitrile and dimethyl azoisobutyrate. Among them, dialkyl peroxides, such as dicumyl peroxide, di-tert-butyl peroxide, 2,5-dimethyl-2,5-di(tert-butylperoxy)-hexine-3, 2,5-dimethyl-2,5-di-(tert-butylperoxy)hexane and 1,4-bis(tert-butylperoxyisopropyl)benzene, are preferred.

The modified ethylene/α-olefin copolymer (B) can be used either alone or in a combination of two or more of them.

The constituent polymer (C) consists of at least one ethylenic copolymer selected from the group consisting of (C-1) an ethylene/α-olefin copolymer having a ratio of weight-average molecular weight to number-average molecular weight (Mw/Mn) of 2.5 or lower, preferably in the range of 1.5–2.3, a melt flow rate (MFR), determined at 190° C., in the range of 0.05–50 g/10 min., preferably 0.1–20 g/10 min., a content of $C_3$ or higher, preferably $C_3$ - to $C_{18}$-α-olefin of 10 mole % or less, preferably in the rage of 3–10 mole %, and a density in the range of 0.970–0.900 g/cm$^3$, preferably 0.940–0.900 g/cm$^3$ and (C-2) a modified ethylene/α-olefin copolymer which is obtained by a graft-copolymerization of 100 parts by weight of the above ethylene/α-olefin copolymer (C-1) with, grafted thereon, 0.01–5 parts by weight, preferably 0.1–4 parts by weight of the unsaturated dicarboxylic acid or its derivative (B-2).

Here, the value of melt flow rate (MFR) is that determined according to ASTM D 1238 E at 190° C. under a load of 2160 g.

For the α-olefin to be copolymerized with ethylene for the ethylene/α-olefin copolymer (C-1), there may be enumerated, for example, propylene, 1-butene, 3-methyl-1-butene, 1-pentene, 1-hexene and 4-methyl-1-pentene.

The ethylene/α-olefin copolymer (C-1) may favorably have a degree of crystallinity in the range of 90–20%, preferably about 70 to about 30%. As the ethylene/α-olefin copolymer (C-1), a linear low density polyethylene (LLDPE) is particularly preferred.

The density of the graft-modified ethylene/α-olefin copolymer (C-2) may favorably be in the range of 0.972–0.902 g/cm$^3$, preferably 0.942–0.902 g/cm$^3$.

For the ethylenic copolymer (C), the ethylene/α-olefin copolymer (C-1) is employed preferably, wherein use of a linear low density polyethylene (LLDPE) is particularly preferred.

The ethylenic copolymer (C) may be used either alone or in a combination of two or more of such copolymers.

For the ethylene/α-olefin copolymer (C-1) to be used as the ethylenic copolymer (C) and that used as the starting copolymer of the modified ethylene/α-olefin copolymer (C-2), those produced by polymerization in the presence of a metallocene catalyst are preferred. Use of a metallocene catalyst can bring about a polymer product having a narrow molecular weight distribution, whereby the ethylene/α-olefin copolymer (C-1) having a narrow molecular weight distribution represented by an Mw/Mn value of 2.5 or lower to be employed according to the present invention can easily be produced.

For the catalyst based on metallocene used as a single-site catalyst for producing the ethylene/α-olefin copolymer (C-1), known metallocene catalysts used conventionally may be used without limitation, for example, catalysts composed of a metallocene (d) having a transition metal, such as titanium, zirconium or hafnium, in combination with of an organic aluminum oxy-compound (e) or with an ionizing ionic compound (f).

For the metallocene (d), concretely, those expressed by the following formula (1) may be enumerated.

$$ML_x \quad (1)$$

in which M denotes a metal selected from the Group IVB of the periodic table and, concretely, zirconium, titanium or hafnium, x is the valence of the transition metal.

L in the formula (1) represents a ligand coordinating to the transition metal, wherein at least one of the ligands has a cyclopentadienyl skeleton and the ligand L having the cyclopentadienyl skeleton may have substituent group(s).

For the ligand having the cyclopentadienyl skeleton, there may be enumerated, for example, cyclopentadienyl; alkyl- or cycloalkyl-substituted cyclopentadienyl, such as, methylcyclopentadienyl, ethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl; and others, such as indenyl, 4,5,6,7-tetrahydroindenyl and fluorenyl. These ligand groups may further be substituted by, for example, halogen atom(s) and trialkylsilyl group(s).

In the case where the compound represented by the formula (1) has two or more ligand groups L having the cyclopentadienyl skeleton, two of these ligand groups having the cyclopentadienyl skeleton may favorably be bound together through a bridging group, for example, an alkylene, such as ethylene or propylene; a substituted alkylene, such as isopropylidene or diphenylmethylene; silylene or a substituted silylene, such as dimethylsilylene, diphenylsilylene or methylphenylsilylene.

For other ligand group L than those having the cyclopentadienyl skeleton, there may be enumerated, for example, hydrocarbon groups, alkoxy groups, aryloxy groups and sulfo-containing groups ($-SO_3R^1$, in which $R^1$ denotes an alkyl, a halogen-substituted alkyl, an aryl or a halogen- or alkyl-substituted aryl) having 1–12 carbon atoms, as well as halogen atoms and hydrogen atom.

When the transition metal of the metallocene (d) represented by the general formula (1) has a valency of 4, it may be represented more concretely by the general formula (2):

$$R^2_p R^3_q R^4_r R^5_s M \quad (2)$$

In the formula (2), M is a transition metal same as that given in the general formula (1), $R^2$ represents a group (ligand) having a cyclopentadienyl skeleton, $R^3$, R4 and $R^5$ represent each, independently of each other, a group having a cyclopentadienyl skeleton or one which is given in the general formula (1) as the ligand L other than that having a cyclopentadienyl skeleton. p is an integer of 1 or higher, wherein p+q+r+s=4.

For the organic aluminum oxy-compound (e) to be used in combination with the metallocene (d), an aluminoxane, such as methylaluminoxane, may be used.

For the ionizing ionic compound (f) to be used together with the metallocene (d), there may be exemplified Lewis acids, ionic compounds, boranes and carboranes.

Examples of the Lewis acid include compounds expressed by the formula BR3 (R stands for fluorine or a phenyl group which may have substituent group(s), such as fluorine, methyl and trifluoromethyl), for example, trifluoroboron, triphenylboron, tris(4-fluorophenyl)boron, tris(3,5-difluorophenyl)boron, tris(4-fluoromethylphenyl)boron, tris (pentafluorophenyl)boron, tris(p-tolyl)boron, tris(o-tolyl) boron and tris(3,5-dimethylphenyl)boron.

As the ionic compound, trialkyl-substituted ammonium salts, N,N-dialkylanilinium salts, dialkylammonium salts, triarylphosphonium salts, triphenylcarbenium tetrakis (pentafluorophenyl)borate, N,N-di-methylanilinium tetrakis (pentafluorophenyl)borate and ferrocenium tetra (pentafluorophenyl)borate may be exemplified.

As the borane compound, Decaborane(14), bis-[tri(n-butyl)ammonium]nonaborate and so on may be exemplified.

The catalyst based on metallocene may be used in combination with an organoaluminum compound.

The resin composition according to the present invention comprises 98–50%, preferably 96–60%, of the polyamide (A), 1–40%, preferably 3–30%, of the modified ethylene/α-olefin copolymer (B) and 1–40%, preferably 3–30%, of the ethylenic copolymer (C), based on the weight of the total sum of the constituent polymers (A), (B) and (C), wherein the weight ratio of (B)/(C) is in the range of 20–0.05, preferably 10–0.1.

If the proportion of each constituent polymer does not fulfil the condition given above, the effect of improvement in the shock resistance is insufficient. In particlular, if the constituent polymer (B) or (C) is incorporated in an excess proportion, the intrinsic superior rigidity of the polyamide (A) becomes undesirably deteriorated.

It is possible to incorporate in the composition according to the preaent invention one or more other constituents including those additives conventionally employed in resins of, for example, polyamides, polyolefins and modified polyolefin resins, in addition to the inevitable constituent polymers (A), (B) and (C). Such other constituents include, for example, antioxidant based on amine and phenol, UV absorber, photoprotecting agent, metal-deactivator, phosphite stabilizer, peroxide decomposing agent, polyamide-stabilizer, basic assistant stabilizer, polyvinyl chloride-stabilizer, nucleation promoter, plasticizer, lubricant, emulsifier, antistatic agent, flame-protecting agent, pigment, carbon black, asbestos, glass fiber, kaoline and talc.

Thus, the resin composition according to the present invention includes a multiconstituent resin composition containing one or more additives in addition to the inevitable constituent polymers.

Favorable additives of such kinds may be selected from the group given below. Resin compositions of the present invention containing especially the antioxidant and the UV absorber exemplified below can exhibit a very effective stability.

For such additives, there may be refered to those given in Japanese Patent Kokai Sho 50-111140 A (corresponding to U.S. Pat. No. 3,975,357). For antioxidant, there may be emunerated, for example, 2,6-dialkylphenols, such as 2,6-di-tert-butyl-4-methylphenol; alkylated hydroquinone derivatives, such as 2,5-di-tert-butyl-hydroquinone; hydroxylated thiodiphenylether, such as 2,2-thiobis(6-tert-butyl-4-methylphenol); alkylidene-bisphenols, such as 2,2'-methylene-bis(6-tertbutyl-4-methylphenol); O-, N- and S-benzyl compounds, such as 3,5,31,5'-tetra-tert-butyl-4,4'-dihydroxybenzylether; 4-hydroxy-3,5-dimethylbenzyl-mercaptoacetatooctadecyl; hydroxybenzylated malonates, such as 2,2-bis(3,5-di-tert-butyl-2-hydroxybenzyl) malonatodioctadecyl and 2-(3-tert-butyl-4-hydroxy-5-methylbenzyl)malonatodioctadecyl; hydroxybenzyl-aromatic hydrocarbons, such as 1,3,5-tri(3,5-di-tert-butyl-4-hydroxybenzyl)-2,4,6-trimethylbenzene; s-triazines, such as 2,4-bisoctylmercapto-6-(3,5-di-tert-butyl-4-hydroxyanilino)-s-triazine; amides of 3,5-di-tert-butyl-4- hydroxyphenyl-propionic acid, such as 1,3,5-tri(3,5-di-tert-butyl-4-hydroxyphenylpropionyl)hexahydro-s-triazine; esters of 3,5-di-tert-butyl-4-hydroxyphenylpropionic acid with mono- or polyvalent alcohols, such as those with methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol and trimethylolpropane; esters of 5-tert-butyl-4-hydroxy-3-methylphenylpropionic acid with mono- or polyvalent alcohols, such as those with methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol and trimethylolpropane; esters of 3,5-di-tert-butyl-4-hydroxyphenylacetic acid with mono- or polyvalent alcohls, such as those with methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol and trimethylolpropane; and aminoaryl derivatives, such as phenyl-1-naphthylamine and phenyl-2-naphthylamine.

As the UV absorber and photoprotecting agent, there may be enumerated, for example, derivatives of 2-(2-hydroxyphenyl)-benzotriazole; derivatives of 2,4-bis(2'-hydroxyphenyl)-6-alkyl-s-triazine; derivatives of 2-hydroxy-benzophenone, 1,3-bis(2'-hydroxybenzoyl) benzene; esters of substututed bezoic acids, such as phenylsalycylate; acrylates, such as ethyl ester and isooctyl ester of α-cyano-β, β-diphenylacrylic acid; nickel compounds, such as a (1:1)- or (1:2)-complex of 2,2'-thiobis(4-tert-octylphenol) with nickel, nickel dibutyldithiocarbamate and 2-hydroxy-4-methylphenyl-undecylketoxime nickelate; and oxalic acid diamides, such as 4,4'-dioctyloxyoxalanilide.

There may be enumerated, as the metal-deactivator, for example, oxanilides and the like, as the phosphite stabilizer, for example, triphenyl phosphite and the like, as the peroxide decomposing agent, for example, salts of 2-mercaptobenzimidazole, such as zinc salt and diphenylthiourea; as the polyamide-stabilizer, for example, iodine and/or a copper salt combined with a phosphorus compound; as the basic assistant stabilizer, for example, polyvinyl pyrrolidone, polyurethane and an alkali or alkaline earth metal salt of a higher saturated or unsaturated aliphatic fatty acid, such as calcium stearate; as the polyvinyl chloride-stabilizer, for example, organotin compounds, barium and cadmium salts of fatty acids; and as the nucleation promoter, for example, 4-tert-butyl benzoate.

The blending amount of such additive may vary in wide range.

According to the present invention, it is preferable to use as the antioxidant, in particular, phenolic one, wherein the blending amount thereof may favorably be in the range from about 0.01 to about 3% by weight.

The resin composition according to the present invention can be prepared by melt blending in various ways. For example, it may be prepared by mixing voluntary two constituent polymers preliminarily and blending, then, the resulting premix with the remaining constituents or, alternatively, by mixing the three constituent polymers simultaneously. It is possible to incorporate, if necessary, further addition of additive(s), such as antioxidant and/or other(s), on a voluntary stage.

It is favorable to prepare the resin composition according to the present invention by melt-mixing preliminarily the constituent polymers (B) and (C) and melt-blending the resulting premix with the polyamide (A). Here, the constituent polymers (B) and (C) are preliminarily melt-mixed in a weight proportion of (B)/(C) favorably in the range of 20–0.05, preferably 10–0.1, whereupon the so-obtained premix is melt-mixed with 98–50 parts by weight, preferably 96–60 parts by weight of the polyamide (A), wherein the total amount of the constituent polymers (A), (B) and (C) amounts to 100 parts by weight. The polyamide resin composition produced in this manner is superior especially in the shock resistance, rigidity and anti-water-absorptibility.

Further, it is also favorable to prepare the premix mentioned above under incorporation of an antioxidant. As the antioxidant to be incorporated in preparing the premix according to the present invention, a phenolic antioxidant may especially preferably be used in an amount in the range from about 0.01 to about 3 parts by weight, preferably from about 0.02 to about 0.5 part by weight, per 100 parts by weight of the resulting premix.

The resin composition according to the present invention is improved in particular, in the shock resistance, especially, low temperature shock resistance, in the anti-water-absorptibility and in the resistance to saline, while maintaining a high rigidity.

The resin composition according to the present invention can be formed into various articles by means of known melt-molding techniques. For example, it can be formed by injection molding, extrusion molding, compression molding and foaming into wide viriety of articles, such as automobile parts, electric devices and instruments and parts of electric machines.

As detailed above, by blending the polyamide (A) with a specific modified ethylene/α-olefin copolymer (B) and with a specific ethylenic copolymer (C) in a specific proportion, the polyamide resin composition according to the present invention is superior especially in the shock resistance, in particular, low temperature shock resistance, in the rigidity and in the anti-water-absorptibility.

By the process for producing the polyamide resin composition according to the present invention by melt-mixing preliminarily the modified ethylene/α-olefin copolymer (B) with the ethylenic copolymer (C), followed by melt-mixing the resulting premix with the polyamide (A), it is possible to obtain the polyamide resin composition according to the present invention superior in the shock resistance, especially low temperature shock resistance, in the rigidity and in the anti-water-absorptibility in an easy and efficient way.

THE BEST MODE FOR EMBODYING THE INVENTION

Below, the present invention will be described by way of Examples.

PRODUCTION EXAMPLE 1

<Production of an Ethylene/α-olefin Copolymer as the Constituent Polymer (C)>

Preparation of a Metallocene Catalyst 10.0 kg of silica dryed at 250° C. for 10 hours were suspended in 154 liters of toluene and the resulting suspension was cooled down to 0° C. Thereto was then added dropwise 57.5 liters of a toluene solution of methylaluminoxane (Al content=1.33 mol/l) over a period of one hour, while maintaining the temperature of the system at 0° C. The reaction was continued succeedingly for 30 minutes at 0° C., whereupon the temperature was elevated to 95° C. over a period of 1.5 hours and the reaction was continued at this temperature for further 20 hours. Then, the temperature was lowered down to 60° C. and the supernatant liquid was decanted off. The resulting solid matter was washed twice with toluene and was then re-suspended in 100 liters of toluene. To the so-obtained suspension, 16.8 liters of a toluene solution of bis(1-methyl-3-n-butyl-cyclopentadienyl)zirconium dichloride (Zr concentration= 27.0 mmol/l) were dropped at 80° C. over a period of 30 minutes, whereupon the reaction was continued for further 2 hours at this temperature. Then, the solids were separated from the supernatant and washed twice with hexane, whereby a solid metallocene catalyst having a zirconium content of 3.5 mg per one gram of the solid catalyst was obtained.

Preparation of the Pre-polymerization Catalyst

To 87 liters of a hexane solution containing 2.5 moles of triisobutylaluminum, 870 g of the metallocene catalyst obtained as above and 260 g of 1-hexene were added and a pre-polymerization of ethylene was effected at a temperature of 35° C. for 5 hours, whereby a prepolymerization catalyst was obtained on which 10 grams of polyethylene was pre-polymerized per one gram of the solid catalyst.

Polymerization

On a continuous fluidized bed vapor phase polymerization reactor, a copolymerization of ethylene with 1-hexene was carried out at a temperature of 70° C. under a total pressure of 2.0 MPa (20 kgf/cm$^2$ gauge). To the polymerization reactor, the pre-polymerization catalyst prepared as above was supplied at a rate of 0.03 mmol/hr, as converted into zirconium atom, together with 5.0 mmol/hr of triisobutylaluminum, while supplying thereto ethylene, 1-hexene, hydrogen gas and nitrogen gas continuously so as to maintain a constant gas composition during the polymerization (a gas composition with 1-hexene/ethylene mole ratio of 0.035, hydrogen/ethylene mole ratio of $4.5 \times 10^4$ and ethylene concentration of 70 mole %).

An ethylene/α-olefin copolymer (LLDPE) was obtained at a yield of 6.0 kg/hr, which had a density of 0.905 g/cm$^3$, an MFR of 4.0 g/10 min. and an Mw/Mn ratio of 2.2, wherein the temperature at the maximum peak of the heat absorption curve determined by differential scanning calorimeter (DSC) was found to be 106.8° C., a content of decane-soluble matter at 23° C. was found to be 0.22% by weight and the number of unsaturation bond in the copolymer molecule was determined to be 0.09 per 1,000 carbon atoms and 0.70 per polymer molecule.

PRODUCTION EXAMPLE 2

<Production of Ethylene/α-olefin Copolymers to be used in Comparative Examples>

Preparation of the Catalyst Components

One mole of a commercial product of anhydrous magnesium chloride was suspended in 2 liters of desiccated and purified hexane under a nitrogen atmosphere and thereto were added dropwise six moles of ethanol over a period of one hour with agitation to cause the reaction, whereupon the reaction was continued at room temperaturefor one hour. After the completion of the reaction, 2.6 moles of diethylaluminum chloride were added dropwise to the resulting reaction mixture at room temperature and agitation was continued for two hours. Then, 6 moles of titanium tetrachloride were added to the mixture and the temperature of the mixture was elevated to 80° C., whereupon the reaction was continued for three hours with agitation. After the reaction, the resulting solid matter was separated and was washed with purified hexane repeatedly. The composition of the resulting solid matter (referred to in the following as α-1) was analyzed and was found to be as follows:

Ti: 3.6% by weight
Cl: 66.8% by weight
Mg: 20.0% by weight
Al: 0.4% by weight
OC$_2$H$_5$: 4.7% by weight The analytical value for OC$_2$H, was obtained by subjecting the solid matter to a decomposing extraction with H$_2$O/acetone and the extract was analyzed on a gas chromatography for its ethanol content.

To a suspension of α-1 suspended in purified hexane, ethanol was added at room temperature in an amount corresponding to 500 mmol of ethanol per 50 mmol, calculated as Ti, of α-1, whereupon the temperature was elevated to 50° C. to cause the reaction, which was continued for 1.5 hours. After the reaction, the resulting solid matter was washed with purified hexane repeatedly. The so-obtained solid catalyst (referred to in the following as β-1) had the following composition:

Ti: 1.2% by weight
Cl: 52.8% by weight
Mg: 15.9% by weight
Al: 0.7% by weight
OC$_2$HR: 22.7% by weight The analytical value for OC$_2$H$_5$ was obtained in the manner as explained above.

Polymerization

To a continuous polymerization reactor of a capacity of 200 liters, 85 liters/hr of desiccated and purified hexane, 6 mmol/hr of diethylaluminum chloride, 6 mmol/hr of ethylaluminum sesquichloride and 0.42 mmol/hr, as converted into Ti, of the catalyst (α-1) obtained as above were supplied continuously together with 13 kg/hr of ethylene and 9 kg/hr of 1-butene as the starting materials and with 8.0 liters/hr of hydrogen and the copolymerization was carried out at a temperature of 170° C. under a total pressure of 3.1 MPa (30 kgf/cm$^2$ gauge) for an average residence time of 1.3 hours so as to reach a copolymer concentration in the reaction solvent, hexane, of 130 g/l. The catalyst activity corresponded to 22100 g of copolymer per mmol of Ti.

EXAMPLE 1

A commercial product of nylon 6 (CM 1017, trade martk, of Toray Ind., Inc.) and a maleic anhydridegrafted modified ethylene/1-butene copolymer (having an MFR at 190° C. of 1.5 g/10 min.), obtained by grafting 1.0 part by weight of maleic anhydride onto 100 parts by weight of an ethylene/1-butene copolymer having an ethylene content of 81 mole %, an MFR of 0.5 g/10 mmin., a density of 0.860 g/cm$^3$ and a 0% crystallinity were blended with the polyethylene (LLDPE) produced in Production Example 1 and having an ethylene content of 94.3 mole %, an MFR (190° C. ) of 4.0 g/10 min., a density of 0.905 g/cm$^3$ and an Mw/Mn ratio of 2.2, in a proportion as given in Table 1 using a blender to prepare a dry blend.

This dry blend was supplied to a 30 mmo biaxial extruder having a L/D ratio of 40 and was kneaded at 245° C. by passing once therethrough at 50 r.p.m. to effect a granulation. A sample of the so-obtained pelletized product was dried at 80° C. for 24 hours, whereupon test specimens were prepared therefrom on an injection molding machine M50A 11-DM of The Japan Steel Works, Ltd. under the following condition:

Cylinder temperature: 245° C.
Injection pressure: 61 MPa (600 kgf/cm$^2$)
Mold temperature: 80° C.

For such test specimens, assessment of the material properties was performed according to the schemes given below. The results are given in Table 2.

<Bending Test>

Using a ⅛ inch thick test specimen, the flexural modulus and the bending stress at the yield point were determined according to ASTM D-790-80.

<Tensile Test>

Using a ⅛ inch thick test specimen, the yield stress, the breaking stress and the breaking elongation were determined according to ASTM D-638.

<Izod Impact Strength>

Using a ⅛ inch thick test specimen, the Izod impact strength with notch was determined at 23° C., minus 20° C. and minus 40° C. according to ASTM D-256.

1 was replaced by the ethylene/α-olefin copolymer of Production Example 2. The results are given also in Table 2.

COMPARATIVE EXAMPLES 3 AND 4

Using the resin composition as given in Table 1, the preparation of test specimen and the testing of material properties were carried out as in Example 1. The results are recited also in Table 2.

TABLE 1

|  | Example | | | Comparative Example | | | |
|---|---|---|---|---|---|---|---|
|  | 1 | 2 | 3 | 1 | 2 | 3 | 4 |
| Copolymer (B-1) | | | | | | | |
| Comonomer | 1-butene | 1-butene | 1-octene | — | 1-butene | 1-butene | 1-butene |
| Proportion (mole %) | 19 | 19 | 17 | — | 19 | 19 | 19 |
| MFR (190° C.) (g/10 min.) | 0.5 | 0.5 | 0.6 | — | 0.5 | 0.5 | 0.5 |
| Density (g/cm³) | 0.860 | 0.860 | 0.861 | — | 0.860 | 0.860 | 0.860 |
| Crystallinity (%) | 0 | 0 | 2 | — | 0 | 0 | 0 |
| Modified Copolymer (B) | | | | | | | |
| Modifying agent | MAH | MAH | MAH | — | MAH | MAH | MAH |
| Grafted proportion (*) | 1.0 | 1.0 | 1.0 | — | 1.0 | 1.0 | 1.0 |
| Ethylenic Copolymer (C) | | | | | | | |
| Comonomer | 1-hexene | 1-hexene | 1-hexene | — | 1-butene | 4-MP | 4-MP |
| Proportion (mole %) | 5.7 | 3.9 | 5.7 | — | 6.1 | 3.2 | 1.4 |
| MFR (190° C.) (g/10 min.) | 4.0 | 4.0 | 4.0 | — | 2.2 | 2.0 | 2.1 |
| Density (g/cm³) | 0.905 | 0.915 | 0.905 | — | 0.904 | 0.921 | 0.935 |
| Crystallinity (%) | 40 | 47 | 40 | — | 40 | 52 | 60 |
| Mw/Mn | 2.2 | 2.2 | 2.2 | — | 2.8 | 3.1 | 2.8 |
| Blending Proportion (wt. %) | | | | | | | |
| Constituent polymer (A) | 70 | 70 | 70 | 100 | 70 | 70 | 70 |
| Constituent polymer (B) | 10 | 10 | 10 | 0 | 10 | 10 | 10 |
| Constituent polymer (C) | 20 | 20 | 20 | 0 | 20 | 20 | 20 |

Note:
(*): Part by weight per 100 parts by weight of the starting copolymer
MAH = maleic anhydride
4-MP = 4-methyl-1-pentene

EXAMPLE 2

The procedures of Example 1 were followed except that the ethylene/1-hexene copolymer given in Table 1 was employed as the ethylenic copolymer (C). The results are given in Table 2.

EXAMPLE 3

The procedures of Example 1 were followed except that a maleic anhydride-grafted modified ethylene/1-octene copolymer having an MFR (190° C.) of 0.6 g/10 min. was used instead of the maleic anhydridegrafted modified ethylene/1-butene copolymer as the constituent polymer (B). The results are given in Table 2.

COMPARATIVE EXAMPLE 1

Using the polyamide (A) only, similar test specimen was prepared as in Example 1 and was examined for its material properties in the same manner as in Example 1. The results are recited also in Table 2.

COMPARATIVE EXAMPLE 2

The procedures of Example 1 were followed except that the ethylene/a -olefin copolymer (C) of Production Example

TABLE 2

| Test Results | Example | | | Comparative Example | | | |
|---|---|---|---|---|---|---|---|
|  | 1 | 2 | 3 | 1 | 2 | 3 | 4 |
| Bending Test | | | | | | | |
| Yield bending stress (MPa) | 64 | 63 | 64 | 110 | 58 | 60 | 62 |
| Initial elast. modul. (MPa) | 1,600 | 1,620 | 1,620 | 2,600 | 1,500 | 1,530 | 1,580 |
| Tensile Test | | | | | | | |
| Yield stress (MPa) | 44 | 44 | 44 | 80 | 41 | 42 | 44 |
| Breaking stress (MPa) | 58 | 59 | 59 | 51 | 45 | 57 | 58 |
| Breaking elongation (%) | 400 | 400 | 400 | 190 | 250 | 400 | 400 |
| Young's modulas (MPa) | 1650 | 1680 | 1670 | 2500 | 1520 | 1550 | 1600 |
| Izod Test | | | | | | | |
| at 23° C. (J/m) | 920 | 900 | 920 | 50 | 800 | 780 | 750 |
| at −20° C. (J/m) | 800 | 740 | 820 | 30 | 580 | 550 | 150 |
| at −40° C. (J/m) | 150 | 145 | 155 | 30 | 110 | 100 | 90 |

What is claimed is:

1. A polyamide resin composition comprising
   (A) 98–50% of a polyamide,
   (B) 1–40% of a modified ethylene/α-olefin copolymer having a melt flow rate (MFR), determined at 190° C., of 0.05–50 g/10 min., obtained by a graft-copolymerization of
      (B-1) 100 parts by weight of an ethylene/α-olefin copolymer having an ethylene content of 40–93 mole %, a content of $C_3$ or higher α-olefin of 60–7 mole % and a density of lower than 0.900 g/cm$^3$ with, grafted thereon,
      (B-2) 0.01–5 parts by weight of an unsaturated dicarboxylic acid or its derivative, and
   (C) 1–40% of at least one ethylenic copolymer selected from the group consisting of
      (C-1) an ethylene/α-olefin copolymer having a ratio of weight-average molecular weight to number-average molecular weight (Mw/Mn) of 2.5 or lower, a melt flow rate (MFR), determined at 190° C., of 0.05–50 g/10 min., a content of $C_3$ or higher α-olefin of 10 mole % or less and a density in the range of 0.970–0.900 g/cm$^3$ and
      (C-2) a modified ethylene/α-olefin copolymer obtained by a graft-copolymerization of 100 parts by weight of the ethylene/α-olefin copolymer (C-1) with, grafted thereon, 0.01–5 parts by weight of the unsaturated dicarboxylic acid or its derivative (B-2),
   based on the total weight of the constituent polymers (A), (B) and (C), wherein the weight ratio of (B)/(C) is in the range of 20–0.05.

2. A polyamide resin composition as claimed in claim 1, wherein the ethylene/α-olefin copolymer (B-1) has a density in the range of 0.850–0.890 g/cml.

3. A polyamide resin composition as claimed in claim 1 or 2, wherein the ethylene/α-olefin copolymer (C-1) is produced by polymerization in the presence of a metallocene catalyst.

4. A polyamide resin composition as claimed in claim 1 or 2, wherein the ethylene/α-olefin copolymer (C-1) is a linear low density polyethylene (LLDPE) produced by polymerization in the presence of a metallocene catalyst.

5. A polyamide resin composition as claimed in claim 1, wherein the ethylene/α-olefin copolymer (C-1) has a density in the range of 0.940–0.900 g/cm$^3$.

6. A process for producing a polyamide resin composition, comprising melt mixing preliminarily
   (B) 1–40 parts by weight of a modified ethylene/α-olefin copolymer having a melt flow rate (MFR), determined at 190° C., of 0.05–50 g/10 min., obtained by a graft-copolymerization of
      (B-1) 100 parts by weight of an ethylene/α-olefin copolymer having an ethylene content of 40–93 mole %, a content of $C_3$ or higher α-olefin of 60–7 mole % and a density of lower than 0.900 g/cm$^3$ with, grafted thereon,
      (B-2) 0.01–5 parts by weight of an unsaturated dicarboxylic acid or its derivative with
   (C) 1–40 parts by weight of at lest one ethylenic copolymer selected from the group consisting of
      (C-1) an ethylene/α-olefin copolymer having a ratio of weight-average molecular weight to number-average molecular weight (Mw/Mn) of 2.5 or lower, a melt flow rate (MFR), determined at 190° C. of 0.05–50 g/10 min., a content of $C_3$ or higher α-olefin of 10 mole % or less and a density in the range of 0.970–0.900 g/cm$^3$ and
      (C-2) a modified ethylene/α-olefin co-polymer obtained by a graft-copolymerization of 100 parts by weight of the ethylene/α-olefin copolymer (C-1) with, grafted thereon, 0.01–5 parts by weight of the unsaturated dicarboxylic acid or its derivative (B-2), in a weight ratio of (B)/(C) within a range of 20–0.05 and melt mixing this premix with 98–50 parts by weight of a polyamide (A), wherein the total sum of the constituent polymers (A), (B) and (C) amounts to 100 parts by weight.

7. A process as claimed in claim 6, wherein the ethylene/α-olefin copolymer (C-1) is produced by polymerization in the presence of a metallocene catalyst.

8. A process as claimed in claim 6, wherein the ethylene/α-olefin copolymer (C-1) is a linear low density polyethylene (LLDPE) produced by polymerization in the presence of a metallocene catalyst.

* * * * *

UNITED STATES PATENT AND TRADEMARK OFFICE
CERTIFICATE OF CORRECTION

PATENT NO. : 6,008,297
DATED : December 28, 1999
INVENTOR(S) : Tanaka et al.

It is certified that error appears in the above-identified patent and that said Letters Patent is hereby corrected as shown below:

In column 15, line 35 (claim 2), please change "g/cml" to -- $g/cm^3$ --.

Signed and Sealed this

Twentieth Day of March, 2001

Attest:

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO. : 6,008,297  
DATED : December 28, 1999  
INVENTOR(S) : Tanaka et al.

Page 1 of 1

It is certified that error appears in the above-identified patent and that said Letters Patent is hereby corrected as shown below:

<u>Column 16,</u>  
Line 16, please change "lest" to -- least --.

Signed and Sealed this

Twenty-eighth Day of August, 2001

*Attest:*

*Attesting Officer*

NICHOLAS P. GODICI  
*Acting Director of the United States Patent and Trademark Office*